(12) United States Patent
Manna et al.

(10) Patent No.: US 10,278,116 B2
(45) Date of Patent: Apr. 30, 2019

(54) METHOD AND USER EQUIPMENT FOR PERFORMING AN INITIAL NETWORK ACCESS PROCEDURE

(71) Applicant: WIPRO LIMITED, Bangalore (IN)

(72) Inventors: Avijit Manna, Kolkata (IN); Saptarshi Chaudhuri, Bangalore (IN); Uttam Sarkar, Chandannagar (IN)

(73) Assignee: Wipro Limited, Bangalore (IN)

( * ) Notice: Subject to any disclaimer, the term of this patent is extended or adjusted under 35 U.S.C. 154(b) by 51 days.

(21) Appl. No.: 15/472,755

(22) Filed: Mar. 29, 2017

(65) Prior Publication Data
US 2018/0288682 A1   Oct. 4, 2018

(51) Int. Cl.
| | |
|---|---|
| H04W 48/10 | (2009.01) |
| H04L 12/18 | (2006.01) |
| H04W 56/00 | (2009.01) |
| H04W 60/04 | (2009.01) |
| H04L 12/801 | (2013.01) |

(52) U.S. Cl.
CPC ......... *H04W 48/10* (2013.01); *H04L 12/1881* (2013.01); *H04L 12/1886* (2013.01); *H04L 47/15* (2013.01); *H04W 56/001* (2013.01); *H04W 60/04* (2013.01)

(58) Field of Classification Search
CPC . H04L 12/1881; H04L 12/1886; H04L 47/15; H04W 56/001; H04W 48/08; H04W 48/10; H04W 72/005; H04W 60/04; H04W 56/00
USPC ...................................................... 370/230
See application file for complete search history.

(56) References Cited

U.S. PATENT DOCUMENTS

| | | | |
|---|---|---|---|
| 9,775,159 B2* | 9/2017 | Kim ................. | H04L 5/0035 |
| 2009/0080361 A1* | 3/2009 | Song ................. | H04L 12/185 |
| | | | 370/312 |
| 2012/0088539 A1 | 4/2012 | Jeong et al. | |
| 2013/0077485 A1 | 3/2013 | Bai et al. | |

(Continued)

FOREIGN PATENT DOCUMENTS

CN          104080148 A   * 10/2014   ........... H04W 48/16

OTHER PUBLICATIONS

Extended European Search Report issued in the European Patent Office in counterpart European Application No. 17210148.7, dated May 4, 2018, 8 pages.

Primary Examiner — Rownak Islam
(74) Attorney, Agent, or Firm — Finnegan, Henderson, Farabow, Garrett & Dunner, LLP

(57) ABSTRACT

The present disclosure relates to a method and system, for performing an initial network access procedure by a user equipment (UE) to access a network in a coverage area. The method includes performing, by the UE, initialization procedure of the UE. Synchronization, is performed by the UE with one or more base stations to prepare a fast network access index (FNAI) list. An initial network access message (INAM) is multicasted to at least one base station based on an INAM multicast list prepared in response to the FNAI list. At least one initial network access response (INAR) is received from the at least one base station in response to the INAM, each INAR comprising a current load information of a base station. The INAR is processed to determine at least one suitable base station. Synchronization with the suitable base station is performed to access the network in the coverage area.

15 Claims, 10 Drawing Sheets

(56) References Cited

U.S. PATENT DOCUMENTS

| | | | |
|---|---|---|---|
| 2013/0089032 A1* | 4/2013 | Jung | H04W 48/16 370/328 |
| 2013/0170385 A1 | 7/2013 | Frenger et al. | |
| 2014/0098804 A1* | 4/2014 | Calcev | H04W 76/10 370/338 |
| 2014/0105183 A1* | 4/2014 | Choi | H04W 4/005 370/335 |
| 2015/0327216 A1* | 11/2015 | Yang | H04W 76/14 370/312 |
| 2015/0334598 A1* | 11/2015 | Duo | H04L 47/10 370/338 |
| 2016/0142981 A1 | 5/2016 | Yi et al. | |
| 2018/0062890 A1* | 3/2018 | Hayes | H04J 11/00 |

* cited by examiner

METHOD AND USER EQUIPMENT FOR PERFORMING AN INITIAL NETWORK ACCESS PROCEDURE

FIELD OF THE DISCLOSURE

The present subject matter generally relates to field of network access. More particularly, the present disclosure discloses a method and user equipment for performing an initial network access procedure.

BACKGROUND

In a wireless mobile network, for example a Long Term Evolution (LTE) network, a user equipment (UE) latches onto a base station (BS) for admission to a coverage area. Such a procedure is referred to as an Initial Network Access Procedure (INAP). The INAP occurs by first measuring, by the UE, a comparative Signal Power-Level (SPL) of available base stations and identify suitable target base stations. The UE then performs sync by reading a primary synchronization signal (PSS) and a secondary synchronization signal (SSS) to get cell-ID, frame-sync. After sync, the UE reads the target base stations cell-broadcast information (or Network Access Related Information (NARI)) upon wait for a periodic broadcast. After reading the NARI, the UE sends an Initial Network Access Message (INAM) to the target base stations. In response, the UE obtains an Initial Network Access Response (INAR) from the target base stations. The INAR includes uplink grant (ULG) resource allocation provided by a network to the UE to send an uplink message to continue the INAP procedure. The UE subsequently transmits a Connection Setup Request (CSR) using INAR to the target base stations, to continue the INAP procedure. In response to the CSR, the UE may receive from the target base stations, a Connection Setup (CS) in case necessary resources have been granted for latching to the target base stations. Otherwise, the UE receives a Connection Reject (CR) from the target base stations.

The above INAP procedure, however, faces different issues. For example, it is difficult to identify a single suitable BS based on the comparative SPL as the target base stations may not have capacity to provide service to the UE due to resource availability, existing load or other issues. Hence, there are latching delays or failures and post-latching service quality issues of the UE to the target base stations.

There is a delay in latching due to wait for receipt of the cell-broadcast information which is further likely to delay latching-on. Also, the INAM request with same sequence number from multiple UEs to the same target base stations is likely to lead to successful processing of first request and discarding of remaining INAM requests (also termed as INAM collision). There is hence a delay in the INAP procedure due to repeat attempts or NAP failure.

Delayed or unsuccessful latching due to constraint of single BS is another issue faced during the INAP procedure. The UE sending CSR to a single BS may lead to unsuccessful latching (receipt of CR), in case the BS has resource constraint or any other constraint. This happens due to that fact that the UE does not have visibility on factors like network resource availability, existing-load-conditions, and the like, of the BS. There is hence a delay in latching process or complete latching failure with the BS, due to repeat unsuccessful attempts by the UE.

Post successful latching, the UE may find issues with service quality such as below par service for existing services or new service denial. Further, every unsuccessful step to latch on a single BS leads to multiple reattempts of the step before sequential attempting the next BS. Waiting time at each unsuccessful step of every sequential latching-attempt cumulatively increases the delay in the latching procedure.

The UE waits for NARI once the sync is done with the BS. However, the BS broadcasts the NARI in a fixed time interval and hence the UE has to wait till next broadcast available which leads to delay in latching. Moreover, the UE waits for NARI. In case, the BS goes to shut down because of some issue or maintenance and stops sending the NARI, the UE will keep on waiting until wait-time-out, leading to unnecessary delay in latching.

The above issues further increase if the number of UEs in the coverage area increases. In an improvement to the existing INAP procedure, use of required information (NARI) for sending INAM is suggested. However, wait time for availability of such information can be variable. In another improvement to the existing INAP procedure, BS suitability assessment based on SPL is addressed, however without considering network conditions (for example, capacity and load-condition of the BS). This leads to multiple unsuccessful attempts during the latching procedure and post latching usability problem.

SUMMARY

Embodiments of present disclosure disclose a method of performing an initial network access procedure by a user equipment to access a network in a coverage area. The method includes performing, by the user equipment (UE), an initialization procedure of the UE. The method includes synchronizing, by the UE, with one or more base stations to prepare a fast network access index (FNAI) list. The method also includes multicasting, by the UE, an initial network access message (INAM) to at least one base station of the one or more base stations based on an INAM multicast list. The INAM multicast list is prepared in response to the FNAI list. The method further includes receiving, by the UE, at least one initial network access response (INAR) from the at least one base station of the one or more base stations in response to the INAM. Each INAR includes a current load information of a base station to indicate post latching service suitability of the at least one base station. Further, the method includes processing, by the UE, the at least one INAR to determine at least one suitable base station. Moreover, the method includes synchronizing, by the UE, with the suitable base station to access the network in the coverage area.

Disclosed herein is a user equipment (UE) for performing an initial network access procedure to access a network in a coverage area. The UE includes a processor and a memory. The memory is communicatively coupled to the processor. The memory stores processor-executable instructions, which, on execution, causes the processor to perform an initialization procedure of the UE. The processor is configured to synchronize with one or more base stations to prepare a fast network access index (FNAI) list. The processor is also configured to multicast an initial network access message (INAM) to at least one base station of the one or more base stations based on an INAM multicast list. The INAM multicast list is prepared in response to the FNAI list. The processor is further configured to receive at least one initial network access response (INAR) from the at least one one base station of the one or more base stations in response to the INAM. Each INAR includes a current load information of a base station to indicate post latching service suitability of the at least one base station. Further, the processor is configured to process the at least one INAR to determine at least one suitable base station. Moreover, the processor is configured to synchronize with the suitable base station to access the network in the coverage area.

Further, the present disclosure comprises a non-transitory computer readable medium including instructions stored thereon that when processed by at least one processor causes a user equipment (UE) to perform an initial network access procedure to access a network in a coverage area. An initialization procedure of the UE is performed. The UE synchronizes with one or more base stations to prepare a fast network access index (FNAI) list. An initial network access message (INAM) is multicasted to at least one base station of the one or more base stations based on an INAM multicast list. The INAM multicast list is prepared in response to the FNAI list. The UE receives at least one initial network access response (INAR) from the at least one base station of the one or more base stations in response to the INAM. Each INAR includes a current load information of a base station to indicate post latching service suitability of the at least one base station. The at least one INAR is processed to determine at least one suitable base station. Moreover, the UE synchronizes with the suitable base station to access the network in the coverage area.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
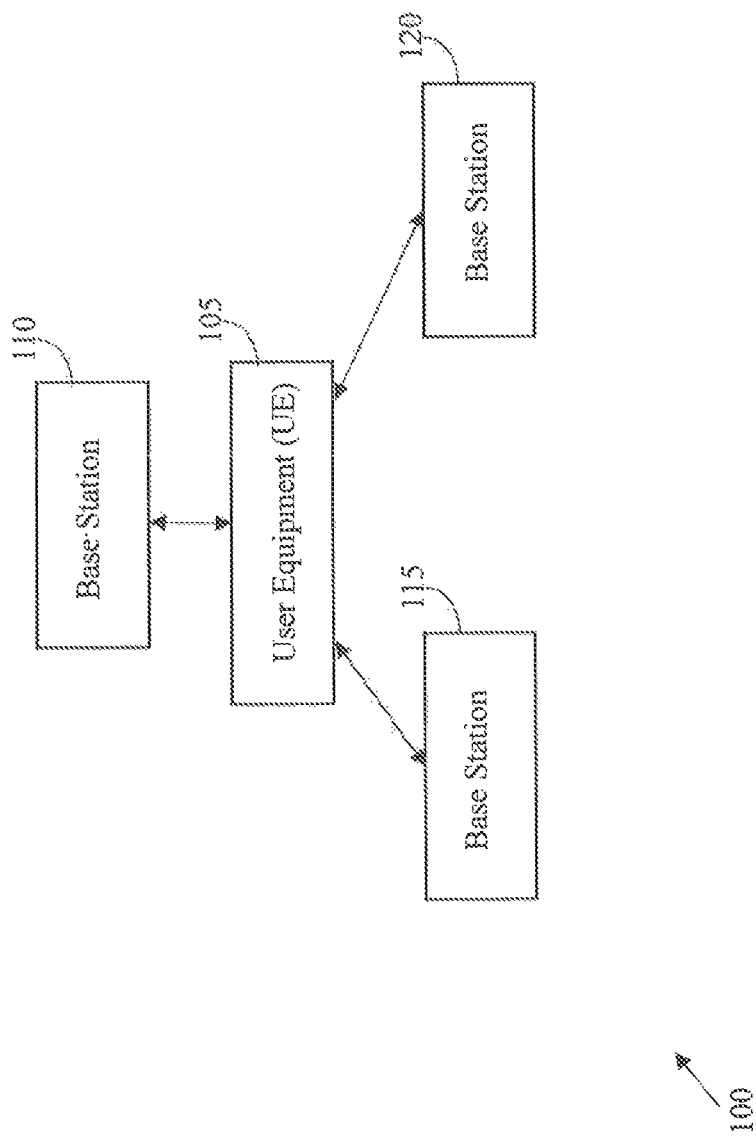
FIG. 1 illustrates an environment, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an environment 100, in accordance with some embodiments of the present disclosure.

The environment 100 includes a user equipment (UE) 105 and a plurality of base stations, for example a base station 110, a base station 115, and a base station 120. The UE 105 is engaged in an initial network access procedure (INAP) with at least one of the base stations using a U interface. Examples of the UE 105 include, but are not limited to, a laptop computer, a desktop computer, a Personal Computer (PC), a notebook, a smartphone, a tablet, as e-book reader, a server, a network server, and the like.

The UE 105 performs the INAP to access a network in a coverage area. The UE 105 performs an initialization procedure. The UE 105 synchronizes with one or more base stations to prepare a fast network access index (FNAI) list. The UE 105 then multicasts an initial network access message (INAM) to at least one base station of the one or more base stations based on an INAM multicast list. The INAM multicast list is prepared in response to the FNAI list. The UE 105 receives at least one initial network access response (INAR) from the at least one base station of the one or more base stations in response to the INAM. Each INAR includes a current load information of a base station to indicate post latching service suitability of the at least one base station. Further, the UE 105 processes the at least one INAR to determine at least one suitable base station, for example the BS 110. The UE 105 is also configured to synchronize with the suitable base station to access the network in the coverage area.

The present disclosure has capability of faster latching mechanism. The present disclosure also reduces latching failure and improves service continuity post latching. The BS 110 and the UE 105 including various components are described in detail with reference to FIGS. 2-8.

Figure 2:
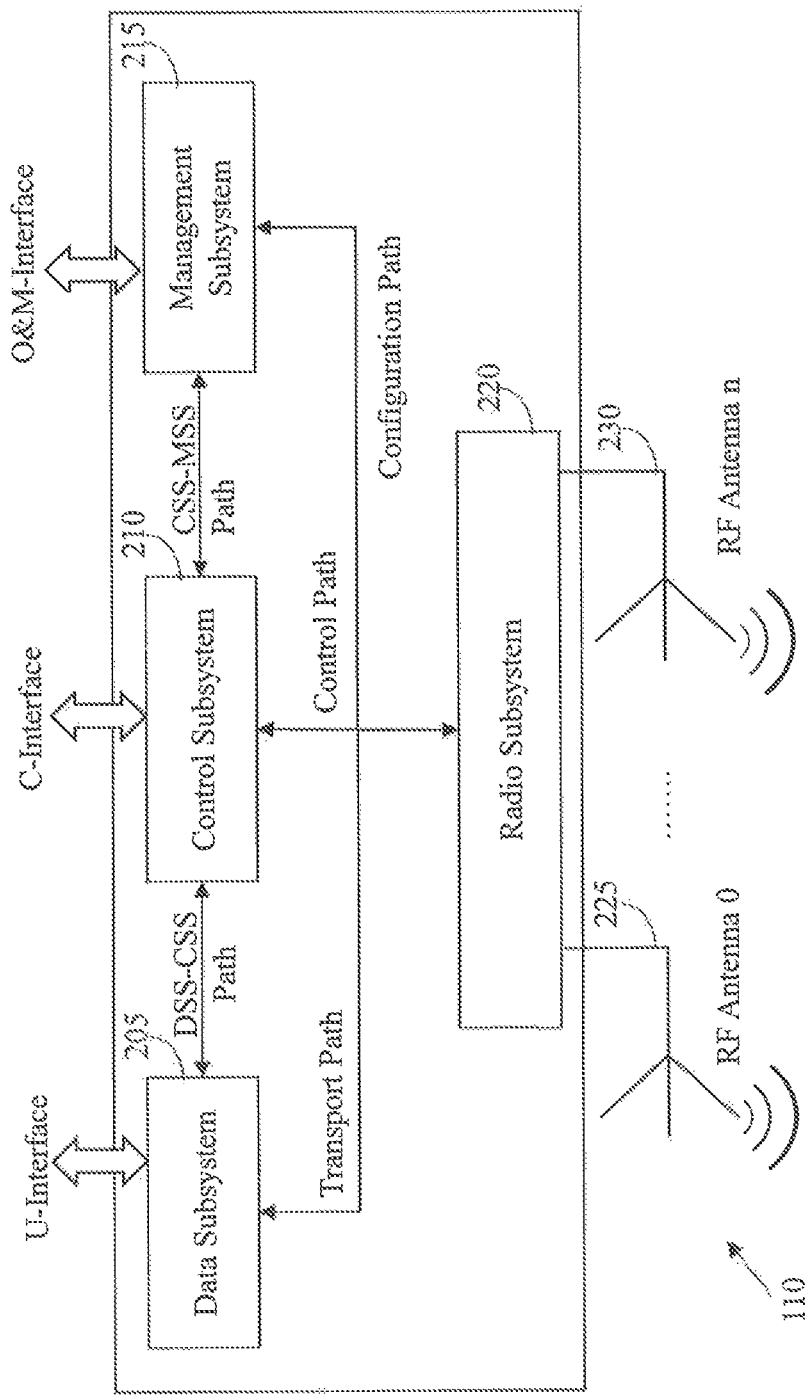
FIG. 2 illustrates a base station in an environment, in accordance with some embodiments of the present disclosure.

Referring now to FIG. 2, the BS 110 in the environment 100 is illustrated, in accordance with some embodiments of the present disclosure. The BS 105 includes a Data Subsystem (DSS) 205, a Control Subsystem (CSS) 210, a Management Subsystem (MSS) 215, and a Radio Subsystem (RSS) 220. A plurality of radio frequency (RF) antennas, for example an RF antenna (0) 225 to an RF antenna (n) 230, is coupled to the BS 110.

The DSS 205 is associated with user data that represents data traffic generated from or to multimedia servers, other users and to or from user multimedia applications, for example video, voice over interact protocol (VoIP) and gaming. The CSS 210 is associated with control data that represents control traffic from/to packet core and the BS 110 to/from user responsible for radio connection establishment, mobility management and session management. The MSS 215 represents management information from operations administration and management (OAM) system towards the BS 110 required for configuration and instantiation.

The DSS 205 is coupled to the CSS 210 by a DSS-CSS path. The BS 110 uses the DSS-CSS path to send and receive control messages and configuration messages from the CSS 210. The CSS 210 is coupled to the MSS 215 by a CSS-MSS path. The BS 110 uses the CSS-MSS path to send control instructions and configuration parameters to the CSS 210 and to receive system level measurement data from the CSS 210. The MSS 215 is coupled to the RSS 220 by a configuration path. The configuration path carries the configuration information over message queues and uses a Femto application programming interface (FAPI) as standard for communication. The CSS 210 is coupled to the RSS 220 by a control path. The control path carries the control data over message queues and uses the FAPI as the standard for communication. The DSS 205 is coupled to the RSS 220 by a transport path. The transport path carries the user data over message queues and uses the FAPI as the standard for communication.

The DSS 205 is coupled to a U-Interface. The U-Interface connects the DSS 205 to a Serving Gateway (SGW) and carries user data over a socket interface. A Gateway Tunneling Protocol (GTP-U) protocol is used for communication to exchange the user data. The CSS 210 is coupled to a C-Interface. The C-Interface connects the CSS 210 to Mobility Management Entity (MME) and carries control information over the socket interface. An S1 Application Protocol (S1-AP) protocol is used for such communication. The MSS 215 is coupled to an O & M Interface. The O&M-Interface connects the MSS 215 to OAM and carries management information over the socket interface. TR-69 protocol is used for such communication.

The BS 110 provides a Fast Network Access Index (FNAI) to the UE 105 to enable faster latching. The BS 110 also provides a current system load to the UE 105 which is trying to latch with the BS 110 so that the UE 105 selects a suitable BS which can provide better service continuity. The DSS 205 is explained in detail with reference to FIG. 3 and the RSS 220 is explained in detail with reference to FIG. 4.

Figure 3:
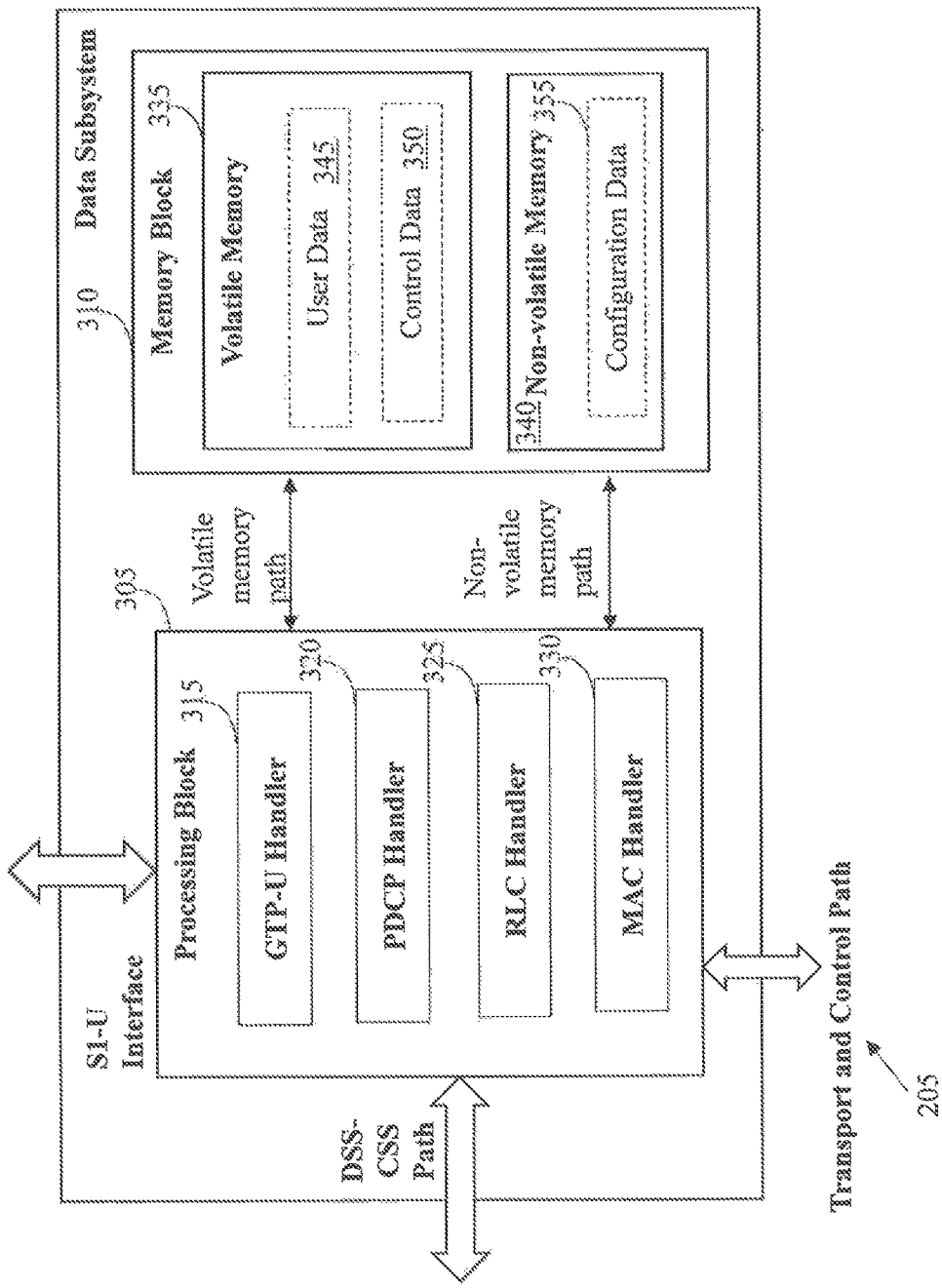
FIG. 3 illustrates a data subsystem of a base station, in accordance with some embodiments of the present disclosure.

Referring now to FIG. 3, the DSS 205 in the BS 110 is illustrated, in accordance with some embodiments of the present disclosure. The DSS 205 is responsible to carry the data traffic and the control messages for the UE 105. The DSS 205 is configured using the configuration messages by the CSS 210. The DSS 205 includes a processing block 305 and a memory block 310.

The processing block 305 includes a GTP-U handler 315, a packet data convergence protocol (PDCP) handler 320, a radio link protocol (RLC) handler 325, a media access control (MAC) handler 330. Configuration of the GTP-U handler 315 is done though the configuration messages received through the DSS-CSS path. The GTP-U handler 315 receives the user data from the SGW through the U-interface in downlink (DL) and from the PDCP handler 320 in uplink (UL). For further processing of received packets, the GTP-U handler 315 follows procedures given in 3GPP TS 29.281. The GTP-U handler 315 provides a tunnel of the data traffic between the BS 110 and the SGW. After processing, the GTP-U handler 315 sends the packets to the SGW in UL and to the PDCP handler 320 in DL.

Configuration of the PDCP handler 320 is done through the configuration messages received by the DSS-CSS path. The PDCP handler 320 receives the control data from the CSS 210 in DL and from the RLC handler 325 in UL. The user data is received by the PDCP handler 320 from the GTP-U handler 315 in DL and from the RLC handler 325 in UL. The PDCP handler 320 processes the data further as given in 3GPP TS 36.323. The PDCP handler 320 is responsible for header compression of the user data in DL and decompression in UL. The PDCP handler 320 has ciphering and deciphering of the data traffic, the control messages and integrity protection in DL and integrity verification in lit of the control messages. To maintain delay sensitivity of the data traffic or user traffic, the PDCP handler 320 also does timer based discard. After processing, the PDCP handler 320 sends the control data to the CSS 210 and the user data to the GTP-U handler 315 in UL, and in DL both the control data and the user data are given to the RLC handler 325.

The RLC handler 325 configures itself using the configuration data received through the DSS-CSS path. The RLC handler 325 receives the control data and the user data from the MAC handler 330 in UL and from the PDCP handler 320 in DL. The RLC handler 325 does further processing on received data as per 3GPP TS 36.322. The RLC handler 325 is responsible for segmentation and concatenation of received packets in DL and reassembly of received packets in UL. The RLC handler 325 also detects duplicate packets received in UL and discards the duplicate packets. The RLC handler 325 sends the data to the PDCP handler 320 in UL and the MAC handler 330 in DL after processing.

The MAC handler 330 receives the configuration data from the CSS 210 by the DSS-CSS path and configures itself. The RLC handler 325 passes the data to the MAC handler 330 in DL and the RSS 220 gives the data to the MAC handler 330 in UL though the PHY interface. On the received data, the MAC handler 330 does further processing, as given in 3GPP TS 36.321. The MAC handler 330 is responsible for error correction through hybrid automatic repeat request (HARQ), priority handling between UEs by means of dynamic scheduling, priority handling between logical channels of one UE called logical channel prioritization. The MAC handler 330 is also responsible of multiplexing of packets received from the RLC handler 325 onto transport blocks (TB) to be delivered to the RSS 220 on transport channels, de multiplexing of received transport blocks (TB) delivered from the RSS 220 on the transport channels. After processing, the MAC handler 330 passes the data to the RSS 220 in DL and to the RLC handler 325 in UL.

The memory block 310 includes a volatile memory 335 and a non-volatile memory 340. The volatile memory 335 stores a user data 345 and a control data 350. The user data 345 is specific to application data of a user, for example voice. The control data is used to control radio access and connection between the UE 105 and the network. The non-volatile memory 340 stores a configuration data 355. The configuration data 355 is termed as the data from the CSS 210 for configuring the DSS 205 to be operational.

The processing block 305 and the memory block 310 is coupled by a volatile memory path and a non-volatile path. The volatile memory path is used by the processing block 305 to store or retrieve the control data or the user data from the volatile memory 335. The non-volatile memory path is used to store and retrieve the configuration data from the non-volatile memory 340. The processing block 305 is coupled to the CSS 210 by the DSS-CSS path. The processing block 305 is coupled to the RSS 220 by the transport path (or a PHY interface) and the control path. The processing block 305 is coupled to the U-Interface. The BS 110 receives the data traffic to and from the SOW through the U-Interface.

The MAC handler 330 of the DSS 205 provides the FNAI to the UE 105 which is used for reducing the NARI wait time in the UE 105. The MAC handler 330 fetches the FNAI from the control data 350 in the volatile memory 335. The MAC handler 330 provides the FNAI to the RSS 220 such that the RSS 220 can encode the MAC to Enhanced Secondary Synchronization Symbol (ESSS) and transmits to the UE 105. The UE 105 can hence reduce the NARI wait time. The MAC handler 330 also provides a current system load in INAR to the UE 105 such that the UE 105 can select the suitable BS, for example the BS 110, for post latching service continuity.

The MAC handler 330 also stores INAM Receive time instance (ReceiveINAMtimeInstance), Time offset for IBS to send INAR (timeOffsetINARIBS), Time to Send INAR (SendINARtimeInstance), and IBS Load Information (BSLoad). The INAM Receive time instance (ReceiveINAMtimeInstance) is the time when INAM is received. Time offset for IBS to send INAR (timeOffsetINARIBS) is time offset to send INAR to IUE after receiving INAM. Time to Send INAR (SendINARtimeInstance) is the time to send INAR to IUE. IBS Load information (BSLoad) is current load information of BS provided by BS to the UE 105 so that it can select the IBS with less loaded IBS. The load calculation is considering Current IBS Throughput, Guaranteed Bit Rate subscription of IUE, Number of UE (% of total capacity), Supported UE/TTI all Core Network overloading condition.

The MAC handler 330 sends the current load information in INAR to the RSS 220 using the transport path and the control path so that the RSS 220 can send it to the UE 105. The UE 105 can then select the suitable BS for post latching service.

Figure 4:
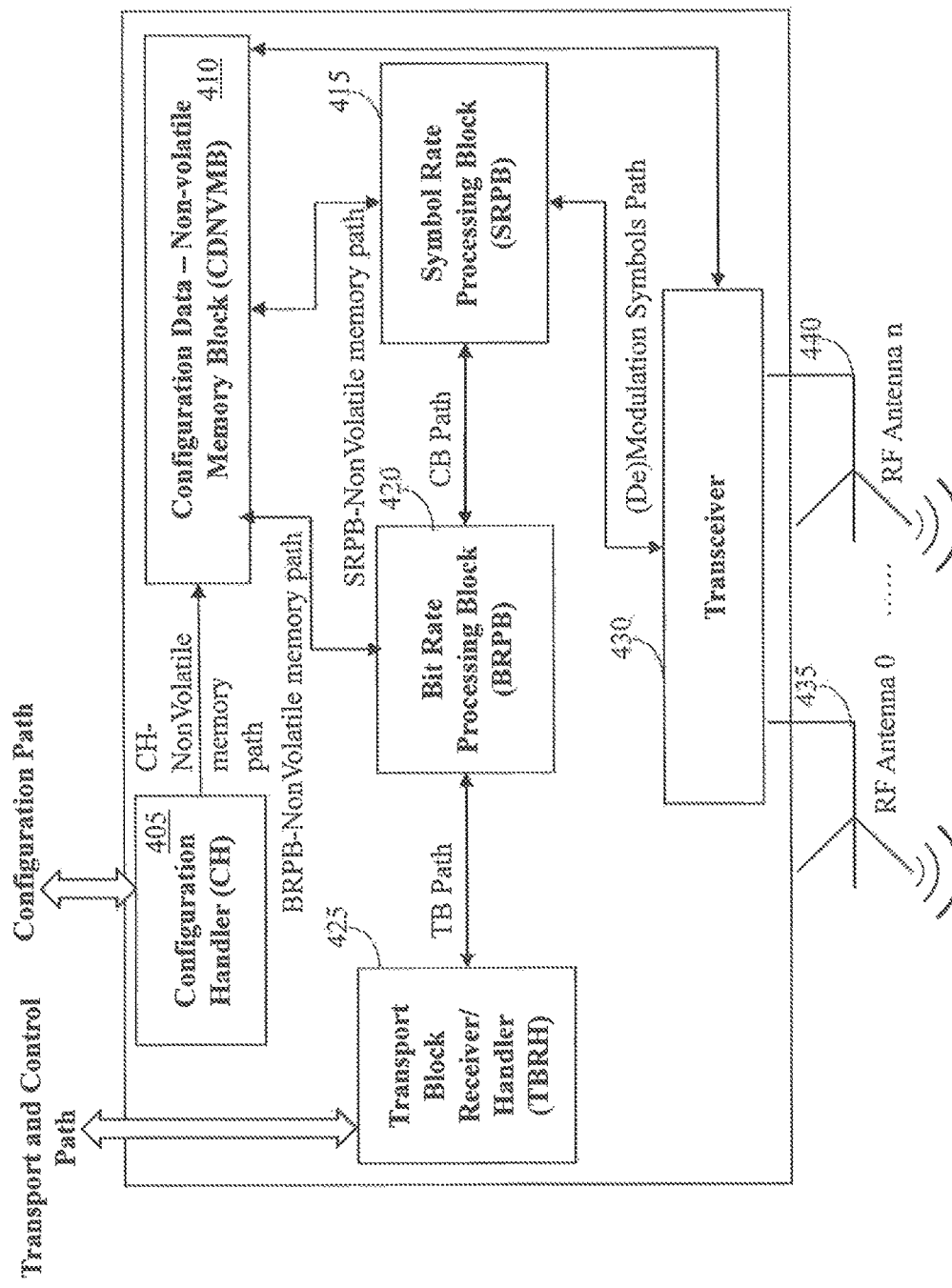
FIG. 4 illustrates a radio subsystem of a base station, in accordance with some embodiments of the present disclosure.

Referring now to FIG. 4, the RSS 220 in the BS 110 is illustrated, in accordance with some embodiments of the present disclosure. The RSS 220 interfaces with the DSS 205 and the CSS 210 and offers data and control transport services to higher layers. The RSS 220 handles channel coding, PHY HARQ processing, modulation, multi-antenna processing, and mapping of signal to appropriate physical time-frequency resources.

The RSS 220 includes a Configuration Handler (CH) 405, a Configuration Data Non-Volatile Memory Block (CDNVMB) 410, a Symbol Rate Processing Block (SRPB) 415, a Bit Rate Processing Block (BRPB) 420, a Transport Block Receiver/Handler (TBRH) 425, and a Transceiver 430. A plurality of radio frequency (RF) antennas, for example an RF antenna (0) 435 to an RF antenna (n) 440, is coupled to the RSS 220.

The CH 405 is coupled to the CDNVMB 410 by a CH-Non-Volatile Memory path. The CH-Non-Volatile Memory path is a unidirectional path used by the CH 405 to write the configuration parameters to the CDNVMB 410. The CH-Non-Volatile Memory path passes the parameter FNAI from the CH 405 to the CDNVMB 410. The CDNVMB 410 is coupled to the SRPB 415 by a SRPB-Non-Volatile Memory path, and is coupled to the BRPB 420 by a BRPB-Non-Volatile Memory path. The SUB-Non-Volatile Memory path is used to connect the SRPB 415 with the CDNVMB 410 where the configuration data is stored. The SRPB-Non-Volatile Memory path passes the parameter FNAI from the CDNVMB 410 to the SRPB 415 for forming ESSS. The BRPB-Non-Volatile Memory path is used to connect the BRPB 420 with the CDNVMB 410 where the configuration data is stored. The SRPB 415 is coupled to the BRPB 420 by a CB path. The CB path carries code words over the message queue. The TBRH 425 is coupled to the BRPB 420 by a TB path. The TB path carries the transport block over the message queue interface. The SRPB 415 is coupled to the Transceiver 430 by a (De)Modulation Symbols path. The (De)Modulation Symbols path carries the modulation symbols over the high speed path. The CH 405 is coupled to the MSS 215 by a configuration path. The TBRH 425 is coupled to the DSS 205 by the transport path and the CSS 210 by the control path.

The RSS 220 accepts the user data and the control data from the DSS 205 in form of transport blocks (TBs) in a communication message over the transport path and the control path, respectively. The TBRH 425 then classifies the data as critical and non-critical data and forwards it to the BRPB 420 over the TB path. In a return path, the TBRH 425 also receives the decoded TB from the BRPB 420 and forwards it to the DSS 205.

The CH 405 receives the configuration messages from the MSS 215 in a communication message over the configuration path. The CH 405 then classifies and stores the configuration information in the CDNVMB 410. The CH 405 takes the parameter FNAI and sends to the CDNVMB 410.

The CDNVMB 410 is used to store the configuration data in form of structures which is accessible to rest of radio frequency (RF) subsystem modules. The CDNVMB 410 stores the parameter FNAI.

The BRPB 420 receives the TBs from the TBRH 425 in a communication message. The BRPB 420 works with instructions given in 3GPP TS 36.212 standard. The BRPB 420 begins processing of the TBs by calculating a cyclic redundancy check (CRC) and attaching it to the TB. If the TB size is larger than a maximum allowable code block size of 6,144 bits, code block segmentation is performed. A new CRC is calculated and attached to each code block before channel encoding. Turbo encoding provides a high-performance forward-error-correction scheme for reliable transmission, rate matching performs puncturing or repetition to match the rate of the available physical channel resource, and HARQ provides a robust retransmission scheme when the user fails to receive the correct data. Bit scrambling is performed after code-block concatenation to reduce length of strings of 0s or 1s in a transmitted signal to avoid synchronization issues at the receiver before modulation. The code blocks (CBs) are then forwarded to the SRPB 415 over the CB path. In a return path, CBs are forwarded to the BRPB 420. The BRPB 420 performs demodulation, descrambling, deconcatination, rate-dematching and HARQ combining. The Turbo decoding and De-segmentation is done on the CBs to get the TBs and if the CRC is successful for the TB then it is forwarded to the TBRH 425.

The SRPB 415 receives the CB in a communication message from the BRPB 420 over the CB path. The SRPB 415 works with instructions given in 3GPP TS 36.212 standard. The SRPB 415 processes the CBs by converting the CBs to modulation symbols. Various modulation schemes (for example, quadrature phase shift keying [QPSK], 16 QAM [quadrative amplitude modulation], or 64 QAM) are used. The modulation symbols are mapped to layers and precoding supports multi-antenna transmission. The modulation symbols are forwarded to the transceiver 430 for transmission. In a return path, the SRPB 415 processes modulations symbols by converting them to CBs. The SRPB 415 provides the ESSS, so that the RSS 220 can provides the FNAI to the UE 105.

The transceiver 430 receives the modulation symbols over the modulation symbols path. The modulation symbols are then mapped to resource elements and the resource elements of orthogonal frequency-division multiplexing (OFDM) symbols are mapped to each antenna port and sent for air transmission.

The RSS 220 provides the ESSS to enable the UE 105 to avoid NARI wait time by using the FNAI (which is a part of the ESSS). The CH 405 of the RSS 220 encodes the FNAI to the ESSS and forms the ESSS and Improved Transceiver (ITR) for transmitting the ESSS to the UE 105.

Figure 5:
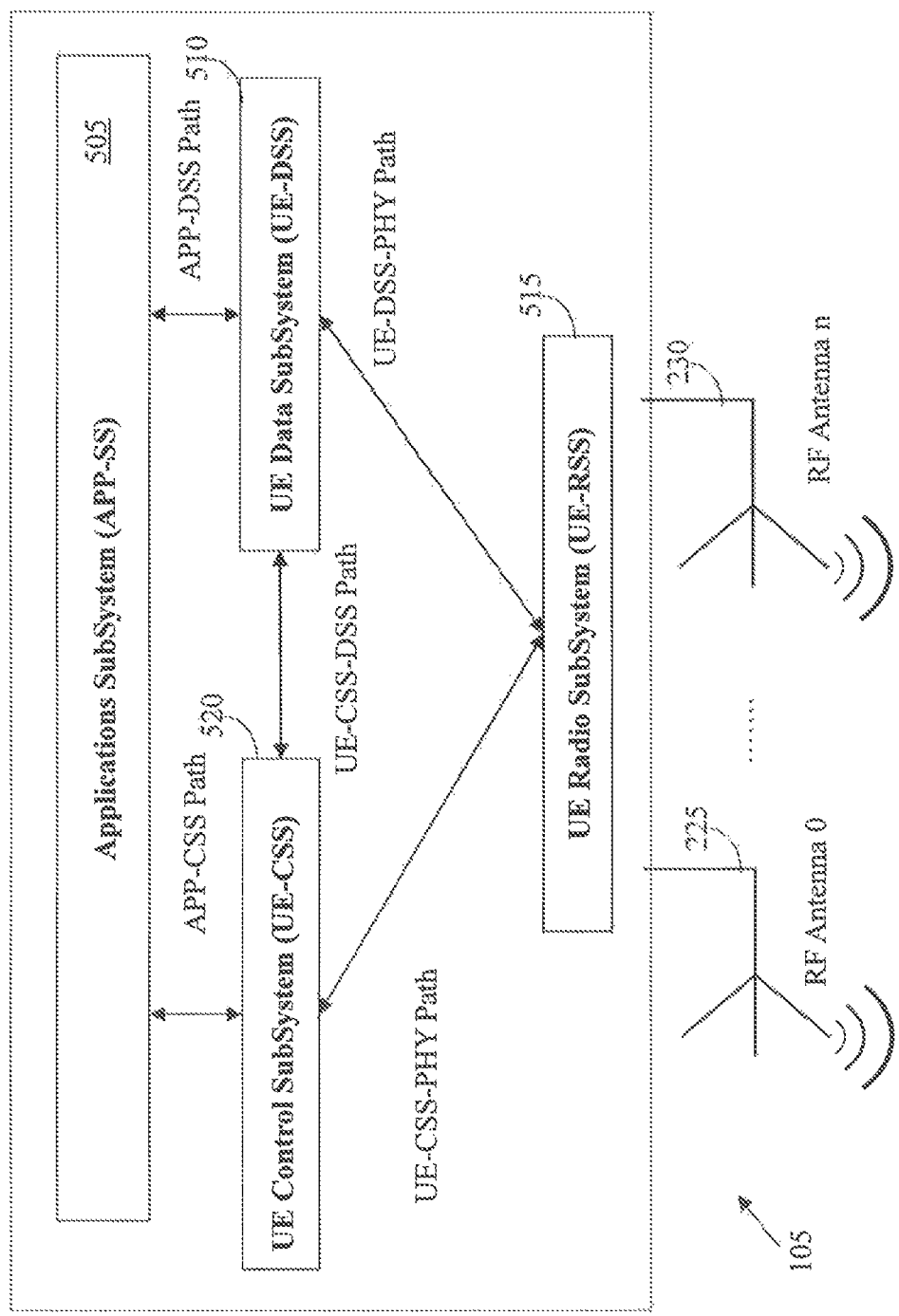
FIG. 5 illustrates a user equipment in an environment, in accordance with some embodiments of the present disclosure.

Referring now to FIG. 5, the UE 105 in the environment 100 is illustrated, in accordance with some embodiments of the present disclosure. The UE 105 includes an Application Subsystem (APP-SS) 505, a UE Data Subsystem (UE-DSS) 510, and a UE Radio Subsystem (UE-RSS) 515. The UE 105 additionally includes a UE Control Subsystem (UE-CSS) 520. A plurality of radio frequency (RF) antennas, for example an RF antenna (0) 525 to an RF antenna (n) 530, is coupled to the UE 105.

The UE-DSS 510 is associated with user data that represents data traffic generated from or to user multimedia applications, for example video, voice over internet protocol (VoIP) and gaming and to or from multimedia servers. The UE-CSS 520 is associated with control data that represents control traffic from/to the BS 110 and responsible for radio connection establishment, mobility management and session management based on user request received from application.

The APP-SS 505 is coupled to the UE-DSS 510 by an APP-DSS path. The APP-DSS path carries the user data. The UE-DSS 510 is coupled to the UE-RSS 515 by a UE-DSS-PHY path. The UE-DSS-PHY path carries the control data and the user data and uses FAPI standard for communication. The UE-RSS 515 is coupled to the UE-CSS 520 by a UE-CSS-PHY path. The UE-CSS-PHY path carries the configuration data and uses FAPI standard for communication. The UE-CSS 520 is further coupled to the APP-SS 505 by an APP-CSS path. The APP-CSS path carries an application request related to the control data. The UE-CSS 520 is coupled to the UE-DSS 510 by a UE-CSS-DSS path. The UE-CSS-DSS path carries the control information.

The UE 105 decodes the FNAI from the ESSS provided by the BS, for example the BS 110, and uses the FNAI to get the NARI so that the UE 105 can send the INAM to the BS 110 at the earliest. The UE 105 can also send the INAM to the plurality of base stations. The UE 105 stores an offset time (Time-Sync-Diff) between the one or more base stations such that the UE 105 can quickly sync to and from one base station to another and sends the INAM and receive the INAR. The UE 105 uses the current load information shared by the BS 110 in the INAR to choose the suitable BS for better post latching service continuity.

Figure 6:
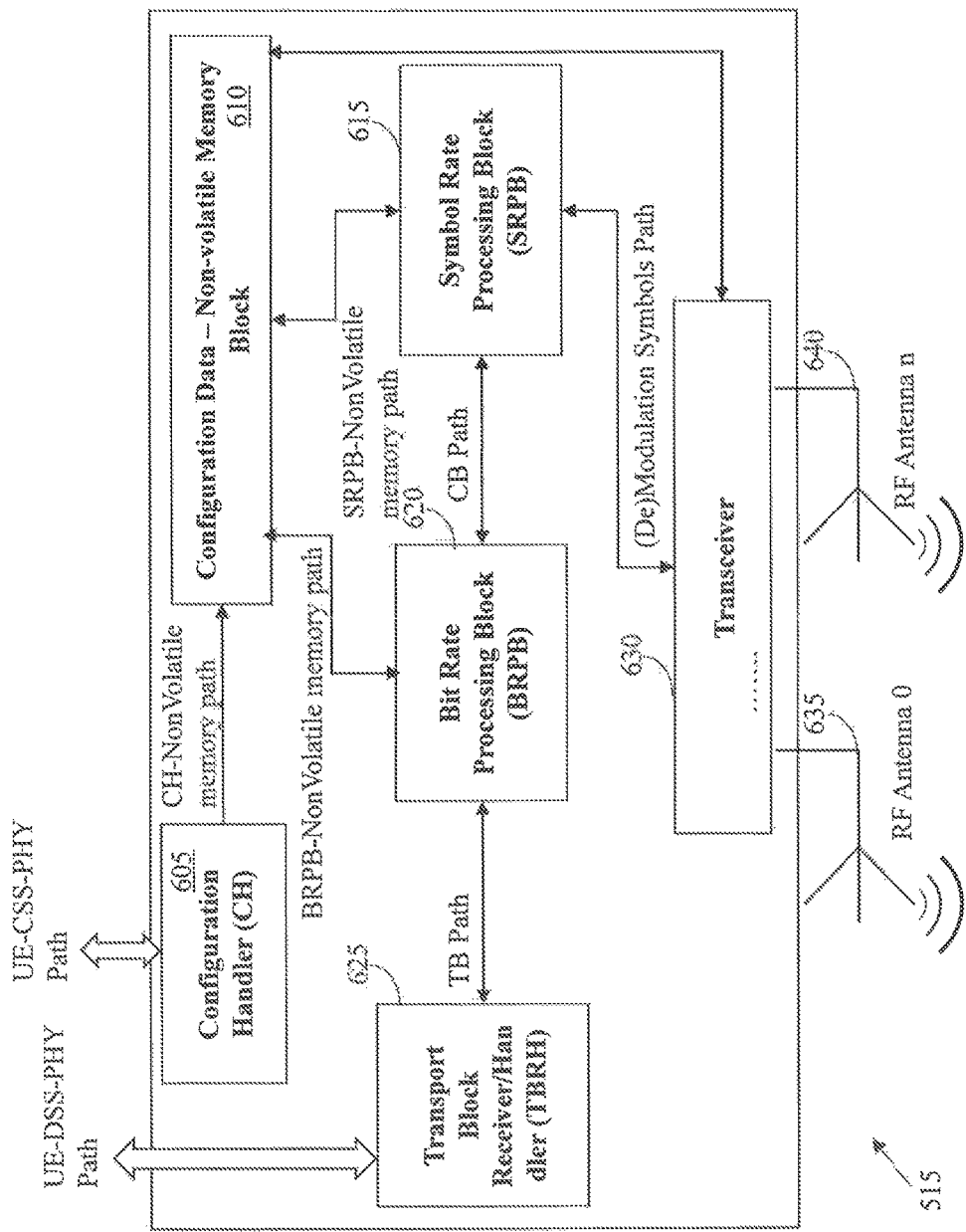
FIG. 6 illustrates a radio subsystem of a user equipment, in accordance with some embodiments of the present disclosure.

Referring now to FIG. 6, the UE-RSS 515 in the UE 105 is illustrated, in accordance with some embodiments of the present disclosure. The UE-RSS 515 interfaces with the UE-DSS 510 and the UE-CSS 520 and offers data and control transport services to higher layers. The UE-RSS 515 handles channel coding, PHY HARQ processing, modulation, multi-antenna processing, and mapping of signal to appropriate physical time-frequency resources.

The UE-RSS 515 includes a Configuration Handler (CH) 605, a Configuration Data Non-Volatile Memory Block (CDNVMB) 610, a Symbol Rate Processing Block (SRPB) 615, a Bit Rate Processing Block (BRPB) 620, a Transport Block Receiver/Handler (TBRH) 625, and a Transceiver 630. A plurality of radio frequency (RF) antennas, for example an RF antenna (0) 635 to an RF antenna (n) 640, is coupled to the UE-RSS 515. The elements of the UE-RSS 515 function similar to elements of the RSS 220, as described with reference to FIG. 4, and is not described herein for sake of brevity.

The CH 605 is coupled to the CDNVMB 610 by a CH-Non-Volatile Memory path. The CH-Non-Volatile Memory path is a unidirectional path used by the CH 605 to write the configuration parameters to the CDNVMB 610. The CH-Non-Volatile Memory path passes the parameter N_BS_SCAN and BS_SCAN_TIMEOUT from the CH 605 to the CDNVMB 610. The CDNVMB 610 is coupled to the SRPB 615 by a SRPB-Non-Volatile Memory path, and is coupled to the BRPB 620 by a BRPB-Non-Volatile Memory path. The SRPB-Non-Volatile Memory path is used to connect the SRPB 615 with the CDNVMB 610 where the configuration data is stored. The SRPB-Non-Volatile Memory Path stores cell id and time sync offset. The BRPB-Non-Volatile Memory path is used to connect the BRPB 620 with the CDNVMB 610 where the configuration data is stored. The SRPB 615 is coupled to the BRPB 620 by a CB path. The CB path carries code words over the message queue. The TBRH 625 is coupled to the BRPB 620 by a TB path. The TB path carries the transport block over the message queue interface. The SRPB 615 is coupled to the Transceiver 630 by a (De)Modulation Symbols path. The (De)Modulation Symbols path carries the modulation symbols over the high speed path. The CH 605 is coupled to the UE-CSS 520 by the UE-CSS-PHY path. The TBRH 625 is coupled to the UE-DSS 510 by the UE-DSS-PHY path.

The UE-RSS 515 scans multiple base stations and decodes the FNAI from ESSS which helps the UE 105 not to wait for NARI for sending INAM. The UE-RSS 515 syncs from one BS to another BS and sends INAM to each BS. The UE-RSS 515 syncs from one BS to another BS and receives the INAR.

The CH 605 takes the parameter N_BS_SCAN (Number of BS to Scan) and BS_SCAN_TIMEOUT (BS Scan Timeout) and sends to the CDNVMB 610. The CDNVMB 610 stores the N_BS_SCAN and BS_SCAN_TIMEOUT receives from the CH 605. The TBRH 625 controls the syncing of one BS to other BS based on the time sync offset and provides INAM to send to each BS. The SRPB 615 decodes the FNAI from ESSS for multiple BSs. The SRPB 615 determines time offset to sync from one BS to another BS for INAM multicast and receiving the INAR from multiple BSs. SRPB memory of the SRPB 615 is a volatile memory (for example, RAM) used by the SRPB 615. The SRPB memory is used to maintain and use synchronization data. The SRPB memory has different parameters including ESSS Time Sync Reference(ESSSTimeSyncRef), ESSS Time Sync for BSi(ESSSTimeSynci), Fast Network Access Index List(FNAIList<1, 2, . . . n>)), Number of FNAI in FNAIList (NumberOfFNAI), Timer for configuration of INAR reception (timerReceiveINAR), Initial Network Access Response(INARj), INAR List (INARBSList<1, 2, . . . n>), Number of INAR in INARBSList (NumberOfINAR).

ESSS Time Sync Reference (ESSSTimeSyncRef) is the time instance when ESSS scanning is started for the first time. ESSS Time Sync for BSi (ESSSTimeSynci) is the time instance when sync is completed on BSi. Fast Network Access Index List(FNAIList<1, 2, . . . n>))—The SRPB 615 scans the ESSS from each BS and gets the CellId, FNAI and determines the time offset between each BS. Number of FNAI in FNAIList (NumberOfFNAI): is the total no of elements in FNAIList at the end of ESSS scan. The_SRPB 615 scans the ESSS and gets the FNAI till the timerBS_SCAN expires or NumberOfFNAI>=countN_BS_SCAN.

For each entry in FNAIList below information is maintained. 'i' ranges from 0 to "NumberOfFNAI". Each entry in FNAIList are stored in separate memory space so that they can be accessed individually.
1. Cell Id(cellIdi) is the Cell ID of the ith BS.
2. FNAI Id(FNAIi) is the FNAI of the ith BS.
3. Time Sync Offset(timeSyncOffseti) is the Time Sync Offset of BSi with ESSSTimeSyncRef.

Timer for configuration of INAR reception(timerReceiveINAR) is used to wait to locally configure the UE 105 to receive the INAR. Initial Network Access Response (INARj) is the INAR for jth BS. INAR List(INARBSList<1, 2, . . . n>) is the list of INAR, received from BSs. Number of INAR in INARBSList(NumberOfINAR) is the total no of elements in INARBSList.

For each entry in INARBSList below information is maintained. 'i' ranges from 0 to "NumberOfINAR". Each entry in INARBSList are stored in separate memory space so that they can be accessed individually.
1. Cell Id(cellIdi) is the Cell ID of the ith BS.
2. Time Sync Offset(timeSyncOffseti) is the Time Sync Offset of BSi with ESSSTimeSyncRef.
3. Initial Network Access Response(INAR) is the NARI of the ith BS.

An RSS_CONFIG_REQ message is sent from the UE-CSS 520 to the UE-RSS 515 to provide countN_BS_SCAN and timerBS_SCAN_TIMEOUT using UE-CSS-PHY path. The response of this message is UE-RSS_CONFIG_CNF. A START_SYNC_CNF message is sent to the UE-DSS 510 from the UE-RSS 515 to provide FNAIList using UE-DSS-PHY-Path, A BS_SYNC_REQ message is sent to the SRPB 615 from the TBRH 625 to sync with provided INAMBSGroupm[j]. cellid, INAMBSGroupm[j].timeSyncOffset using TB Path and CB Path. The response of the message is BS_SYNC_CNF. An INAM_CNF message is sent to the UE-DSS 510 from the UE-RSS 515 to provide INARBSList using UE-DSS-PHY-Path.

Figure 7:
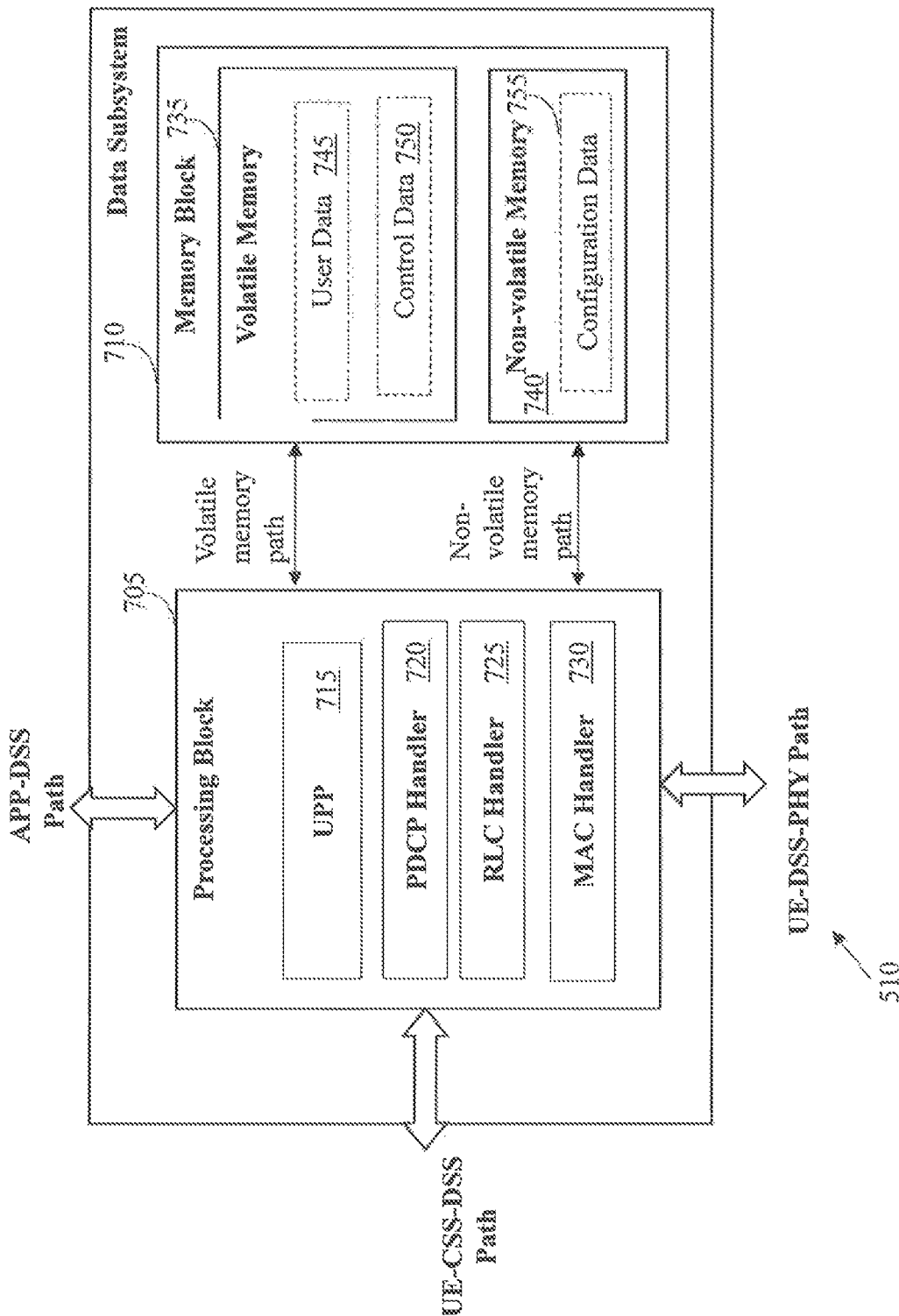
FIG. 7 illustrates a data subsystem of a user equipment, in accordance with some embodiments of the present disclosure.

Referring now to FIG. 7, the UE-DSS 510 in the UE 105 is illustrated, in accordance with some embodiments of the present disclosure. The UE-DSS 510 is responsible for transmitting and receiving the control data and the user data to and from the BS 110. The UE-DSS 510 includes a processing block 705 and a memory block 710.

The processing block 705 includes a User Packet Processing (UPP) 715, a PDCP handler 720, an RLC handler 725, and a MAC handler 730. The UPP 715 takes care of transfer control protocol and internet protocol (TCP/IP) processing with peer TCP/IP modules. The UPP 715 takes care of end-to-end TCP/IP connection and IP data transfer.

The PDCP handler 720 is responsible for header compression and decompression of IP data, transfer of data (user data or control data), maintenance of PDCP Sequence Numbers (SNs), in-sequence delivery of upper layer PDUs at re-establishment of lower layers, duplicate elimination of lower layer SDUs at re-establishment of lower layers for radio bearers mapped on RLC AM, ciphering and deciphering of the user data and the control data, integrity protection and integrity verification of the control data, timer based discard, duplicate discarding.

The RLC handler 725 operates in three modes of operation. Transparent Mode (TM), Unacknowledged Mode (UM), and Acknowledged Mode (AM). The RLC handler 725 is responsible for transfer of upper layer PDUs, error correction through ARQ (Only for AM data transfer), concatenation, segmentation and reassembly of RLC SDUs Only for UM and AM data transfer). The RLC handler 725 is also responsible for re-segmentation of RLC data PDUs (Only for AM data transfer), reordering of RLC data PDUs (Only for UM and AM data transfer), duplicate detection (Only for UM and AM data transfer), RLC SDU discard (Only for UM and AM data transfer), RLC re-establishment, and protocol error detection (Only for AM data transfer).

The MAC Handler 730 is responsible for mapping between logical channels and transport channels, multiplexing of MAC SDUs from one or different logical channels onto transport blocks (TBs) to be delivered to the physical layer on transport channels, de-multiplexing of MAC SDUs from one or different logical channels from the TBs delivered from the physical layer on transport channels, scheduling information reporting, error correction through HARQ, priority handling between UEs by means of dynamic scheduling, priority handling between logical channels of one UE, and logical channel prioritization.

The memory block 710 includes a volatile memory 735 and a non-volatile memory 740. The volatile memory 735 includes a user data 745 and a control data 750. The non-volatile memory 740 includes a configuration data 755. The memory block 710 also functions similar to the memory block 310 of FIG. 3 and is not explained herein for sake of brevity.

The processing block 705 and the memory block 710 is coupled by a volatile memory path and a non-volatile path. The processing block 705 is coupled to the APP-SS 505 by the APP-DSS path. The APP-DSS Path passes the N_BS_S-

CAN and BS_SCAN_TIMEOUT from the APP-SS 505 to the UE-DSS 510. The processing block 705 is coupled to the UE-CSS 520 by the UE-CSS-DSS path. The processing block 705 is coupled to the UE-RSS 515 by the UE-DSS-PHY path.

The MAC Handler 730 can configure the UE-RSS 515 to sync from one BS to another BS and send the INAM to the base stations to reduce the INAP failure. The MAC Handler 730 also uses the current load information shared by base stations (in INAR) to choose the suitable BS for better post latching service continuity. A MAC Handler Memory is a volatile memory (for example, random access memory (RAM)) used by the MAC Handler 730. The MAC Handler Memory has different parameters including a NARI Table, number of set of values of NARI parameters in TableNARI (or NumberOfFNAI), BS information list (or BSInfoList), number of BS in BSInfoList (or NumberofBS), BS Group List for INAM(INAMBSGroupList), Number of BS Group in INAMBSGroupList (NumberOfBSGroup), Initial Network Access Message for Group m (INAMm), Time offset for BS to send INAR(timeOffsetINARm), INAM Transmit time instance (TransmitINAMtineInstance), BS Selection Coefficients (CoefficientsBSi).

NARI Table is used to maintain and use NARI data for the BS as a NARI Table (TableNARI<1, 2, . . . n>). The NARI table (TableNARI) provides different sets of values of NARI parameters. Each set is indexed by the FNAI. Total number of elements in TableNARI includes number of set of values of NARI parameters in TableNARI (or NumberOfFNAI).

For each entry in TableNARI below information is maintained, 'i' ranges from 0 to "NumberOfFNAI". Each entry in TableNARI are stored in separate memory space so that the entries can be accessed individually.

1. An INAM Config Index(INAMConfigIndex)—This parameter determines what type of NARISN (preamble) format should be used and when the UE 105 can transmit INAM.
2. INAM Root Sequence Index(INAMRootSequnceIndex)
3. INAM High Speed Flag(INAMHighSpeedFlag)
4. INAM Zero Correlation Zone Configuration (INAMZeroCorrelationZoneConfig)
5. INAM Frequency Offset (INAMFreqOffset)

The BS Information List (BSInfoList<1, 2, . . . n>)) is a list of BS Information (BSInfo). The MAC Handler 730 gets the CellId, FNAI and time offset and populates the NARI for each BS from TableNARI as indexed by FNAI. The number of BS in BSList (NumberOfBS) is total number of elements in BSInfoList at end of NARI information update.

For each entry in BSInfoList below information is maintained. 'i' ranges from 0 to "NumberOfBS". Each entry in BSInfoList are stored in separate memory space so that they can be accessed individually.

1. Cell Id (cellIdi) is the Cell ID of the ith BS.
2. FNAI Id (FNAIi) is the FNAI of the ith BS.
3. Time Sync Offset (timeSyncOffseti) is the Time Sync Offset of BSi with ESSSTimeSyncRef
4. Network Access Related Information (NARI) is a set of parameters which is required to access the BS. FNAI defines what will be the parameters values with which BS is configured already. So that the UE 105 can use it to get the access of the BS. The parameters are same as TableNARI.

BS Group List for INAM(INAMBSGroupList<1, 2, . . . n>)) is the group of BS with same NARI info. The MAC Handler 730 groups the BSs with same NARI info and adds it in the list INAMBSGroupList, Number of BS Group in INAMBSGroupList (NumberOfBSGroup) is the total no of elements in INAMBSGroupList.

For each entry in INAMBSGroupList below information is maintained. 'i' ranges from 0 to "NumberOfBSGroup". Each entry in INAMBSGroupList are stored in separate memory space so that they can be accessed individually.

1. BS Group for INAM(INAMBSGroup<1, 2, . . . n>) is group of BSInfo to be used for INAM multicast. mth element in INAMBSGroupList is denoted by INAMBSGroupm.

Initial Network Access Message for Group m (INAMm) is the INAM messages for all the BS in INAMBSGroupm. Time offset for IBS to send INAR (timeOffsetINARm) is added in INAM to inform BSs so that BSs start sending the INAR after the timeOffsetINARm from the time it receives INAM. INAM Transmit time instance (TransmitINAMtineInstance) is the time when INAMm multicast is started. BS Selection Coefficients (CoefficientsBSi) decides the selection of BS. The BS is selected with larger coefficient. CoefficientsBSi is the coefficient of ith BS.

The UE-RSS 515 provides the TIME_SYNC_OFFSET to the UE-DSS 510 by the UE-DSS-PHY Path. The UE-DSS 510 configures the UE-RSS 515 to sync to different BS. The UE-DSS 510 sends the configuration parameters to the UE-RSS 515 by the UE-DSS-PHY-Path. The UE-RSS 515 provides the received INAR with BS load information from the BS to the UE-DSS 510 by the UE-DSS-PHY-Path.

A BS_CONNECT_REQ message is sent to the UE-DSS 510 from the UE-CSS 520 to establish connection with the BS using UE-CSS-DSS-Path. A START_SYNC_REQ message is sent to the UE-RSS 515 from the UE-DSS 510 to start synching with the BS using UE-DSS-PHY-Path. An INAM_REQ message is sent to the UE-RSS 515 from the UE-DSS 510 to provide INAMm and INAMBSGroupm using UE-DSS-PHY-Path. A BS_SELECT_REQ message is sent to the UE-RSS 515 from the UE-DSS 510 to select the BS with INARBSList[i].cellid & INARBSList[i].timeSyncOffset using UE-DSS-PHY Path.

Figure 8:
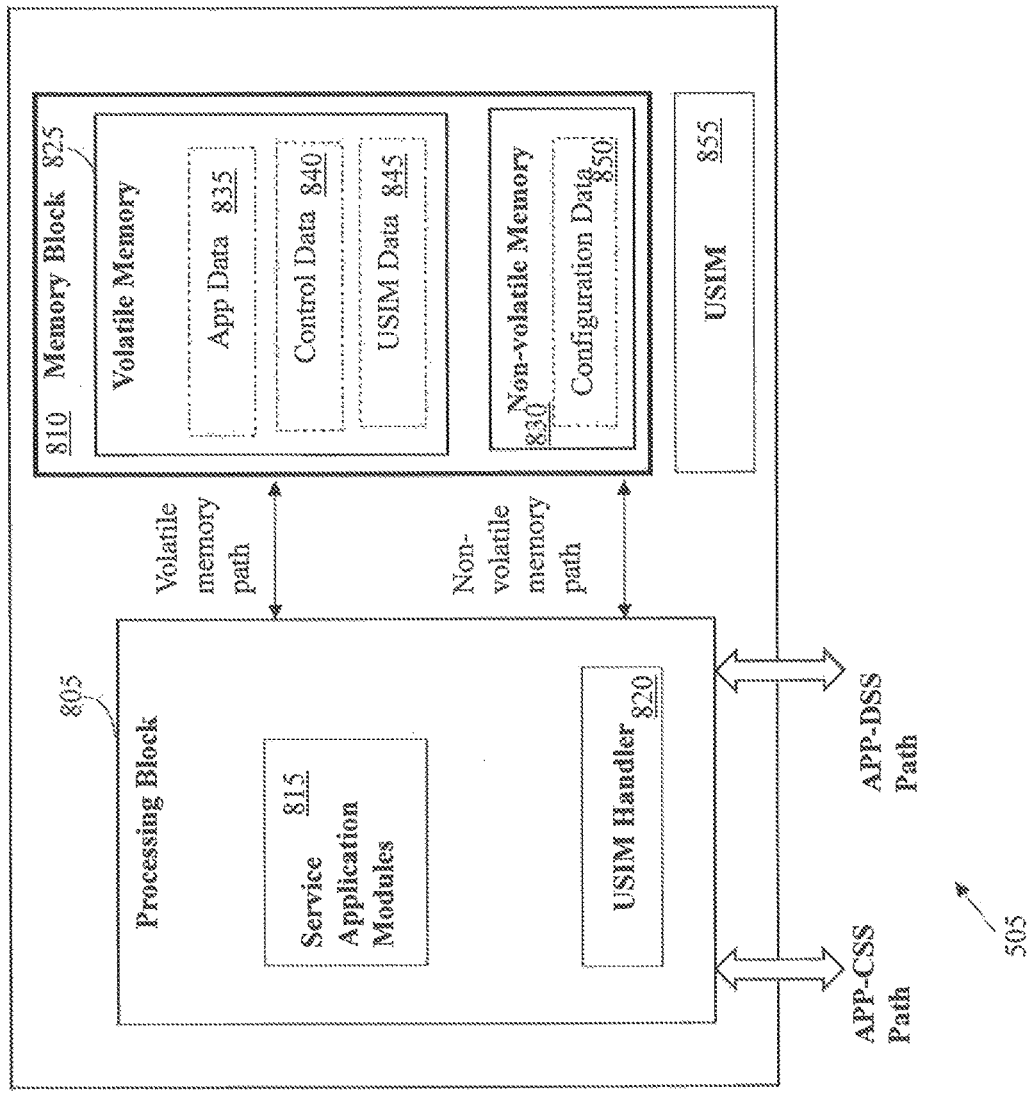
FIG. 8 illustrates an applications subsystem of a user equipment, in accordance with some embodiments of the present disclosure.

Referring now to FIG. 8, the APP-SS 505 in the UE 105 is illustrated, in accordance with some embodiments of the present disclosure. The APP-SS 505 of the UE 105 receives user requests and invokes functions using service application modules. The APP-SS 505 includes a processing block 805 and a memory block 810.

The processing block 805 includes a service application modules (SAM) 815 and a Universal Subscriber Identity Module (USIM) handler 820. The SAM 815 takes a user request and performs the task. As an example, the SAM 815 takes a registration request from the user and initiates it to the UE-CSS 520.

The memory block 810 includes a volatile memory 825 and a non-volatile memory 830. The volatile memory 825 stores an app data 835, a control data 840 and a USIM data 845. The control data 840 is termed as data for controlling the UE-CSS 520, the UE-DSS 510 and connection between the UE 105 and the network. The USIM data 845 is the data copied from USIM by the USIM Handler 820 and stored for faster accessing USIM information. The volatile memory 825 includes an app data 835, a control data 840 and USIM data 845. The non-volatile memory 830 includes a configuration data 850. The non-volatile memory in the APP-SS 505 stores the configuration data 850 related to service application modules 815.

The APP-SS 505 also includes a USIM 855. The USIM 855 is an application that runs on USIM cards. The USIM cards that hold subscriber information and memory, for example for personal directory of numbers. The USIM 820 identifies a subscriber via unique International Mobile Subscriber Identity (IMSI).

The processing block 805 and the memory block 810 is coupled by a volatile memory path and a non-volatile path. The processing block 805 is coupled to UE-CSS 520 by the APP-CSS path. The processing block 805 is coupled to the UE-DSS 510 by the APP-DSS path.

The APP-SS 505 which has improved the USIM 855 and the USIM Handler 820. The APP-SS 505 provides N_BS_S-CAN and BS_SCAN_TIMEOUT to the UE-DSS 510 and the UE-DSS 510 provides it to the UE-RSS 515. The parameters of N_BS_SCAN and BS_SCAN_TIMEOUT restricts the UE-RSS 515 to scan ESSS from multiple BS.

The USIM Handler 820 provides N_BS_SCAN and BS_SCAN_TIMEOUT. The USIM 855 include N_BS_S-CAN and BS_SCAN_TIMEOUT which are configurable. The APP-CSS Path passes N_BS_SCAN and BS_S-CAN_TIMEOUT to the UE-CSS 520. A CONFIG_REQ message is sent from the APP-SS 505 to the UE-CSS 520 to provide countN_BS_SCAN and timerBS_SCAN_TIMEOUT using the APP-CSS-Path. The response of this message is CONFIG_CNF. A REGISTER_REQ message is sent from the APP-SS 505 to the UE-CSS 520 to start registration procedure with the BS using the APP-CSS-Path. The U Interface takes care of sending the ESSS to the UE 105 with FNAI encoded. It also takes care of sending the BS current load information in INAR to the UE 105.

Figure 9:
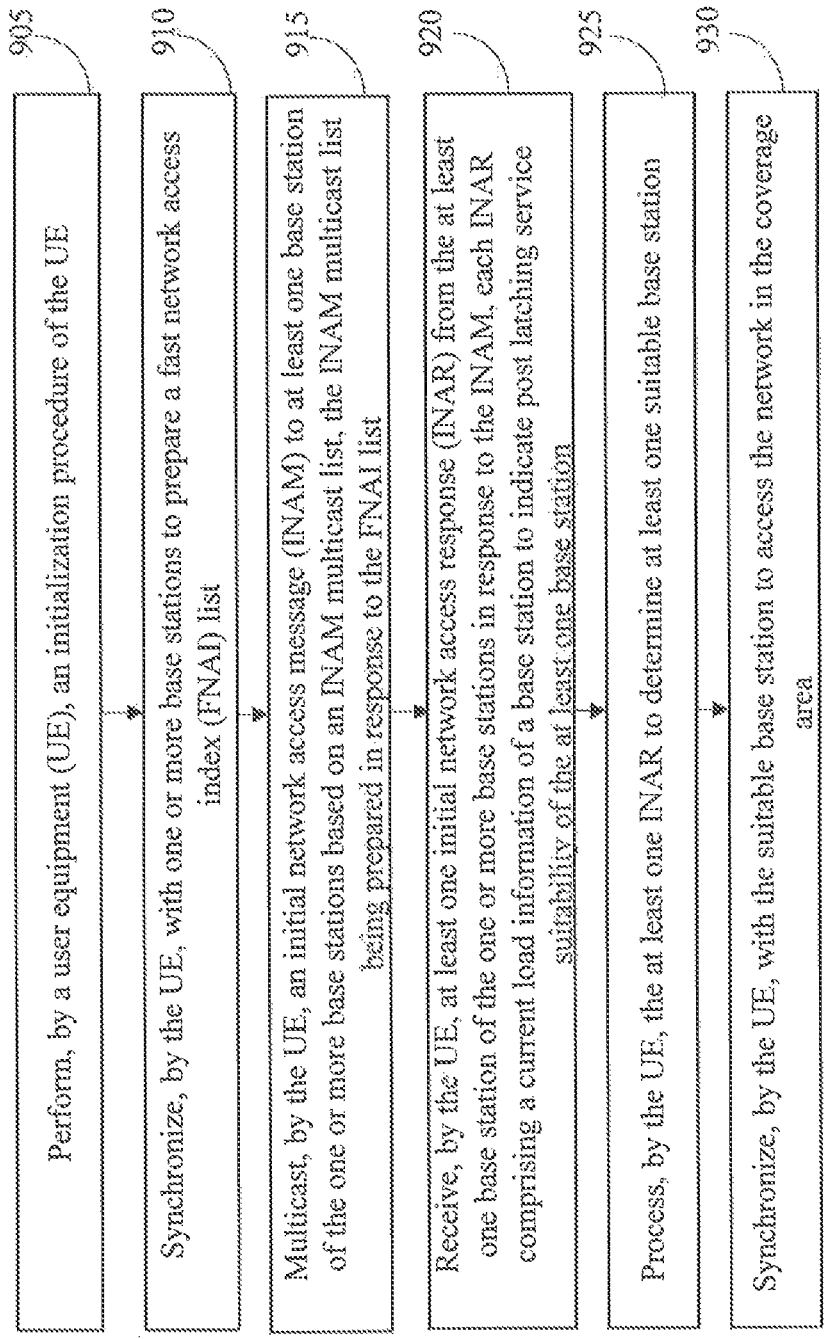
FIG. 9 is a flow diagram illustrating a method of performing an initial network access procedure by a user equipment to access a network in a coverage area, in accordance with some embodiments of the present disclosure.

FIG. 9 is a flow diagram illustrating a method 900 of performing an initial network access procedure by a user equipment (UE), for example the UE 105 of FIG. 1, to access a network in a coverage area, in accordance with some embodiments of the present disclosure.

The order in which the method is described is not intended to be construed as a limitation, and any number of the described method blocks can be combined in any order to implement the method. Additionally, individual blocks may be deleted from the method without departing from the scope of the subject matter described herein.

At step 905, the method 900 includes performing, by the UE, an initialization procedure of the UE.

The initialization procedure of the UE is performed by one of initializing the UE during start-up of the UE, initializing the UE during rebooting of the UE and initializing the UE during re-latching of the UE.

In some embodiments, the initialization procedure of the UE during start-up of the UE and during rebooting of the UE includes the following steps:
1. The USIM handler 820 in the APP-SS 505 reads the N_BS_SCAN and BS_SCAN_TIMEOUT from the 855 USIM and sets
    countN_BS_SCAN=N_BS_SCAN; and
    timerBS_SCAN_TIMEOUT=BS_SCAN_TMEOUT;
2. The APP-SS 505 provides the configuration parameters along with countN_BS_SCAN and timerBS_SCAN_TIMEOUT to the UE-CSS 520 using CONFIG_REQ through the APP-CSS-Path.
3. On receipt of CONFIG_REQ, the UE-CSS 520 provides the configuration parameters along with countN_BS_SCAN and timerBS_SCAN_TIMEOUT to the UE-RSS 515 using the UE-RSS_CONFIG_REQ through the UE-CSS-PHY Path.
4. On receipt of the UE-RSS_CONFIG_REQ, the CH 605 in the UE-RSS 515 stores the configuration parameters along with countN_BS_SCAN and timerBS_SCAN_TIMEOUT to the CDNVMB 610 and returns the UE-RSS_CONFIG_CNF through the UE-CSS-PHY Path.
5. On receipt of the UE-RSS_CONFIG_CNF, the UE-CSS 520 returns CONFIG_CNF to the APP-SS 505 through the APP-CSS-Path.
6. On receipt of CONFIG_CNF, the APP-SS 505 sends the REGISTER_REQ to the UE-CSS 520 through the APP-CSS-Path.
7. On receipt of REGISTER_REQ, the UE-CSS 520 sends BS_CONNECT_REQ to the UE_DSS 510 through the UE-CSS-DSS-Path.
8. On receipt of the BS_CONNECT_REQ, the UE-DSS 510 sends the START_SYNC_REQ to the UE-RSS 515 through the UE-DSS-PHY-Path.

In other embodiments, the initialization procedure of the UE during the re-latching of the UE includes the following steps:
1. The APP-SS 505 sends the REGISTER. REQ to the UE-CSS 520 through the APP-CSS-Path.
2. Perform steps 7 to 8 as provided in the initialization procedure of the UE during start-up of the UE and during the rebooting of the UE.

At step 910, the method 900 includes synchronizing, by the UE, with one or more base stations to prepare a fast network access index (FNAI) list. The FNAI list comprises cell identification number, an FNAI, and an offset time between the one or more base stations. The offset time is added in the INAM to inform the base station to transmit the INAR on expiry of the offset time from receipt of the INAM.

For synchronizing, the method includes scanning, by the UE, a primary synchronization signal (PSS) and an extended secondary synchronization signal (ESSS) for each of the one or more base stations to generate synchronization results. The FNAI list is prepared during the scanning. The following steps are performed during the scanning by the UE:
1. On receipt of START_SYNC_REQ, the SRPB 615 in the UE-RSS 515 starts timerBS_SCAN with the value timerBS_SCAN_TIMEOUT.
2. Prepares FNAIList by performing the following steps:
    1. Reset NumberOfFNAI.
    2. If timerBS_SCAN expires or NumberOfFNAI exceeds countN_BS_SCAN then the synchronization results are provided to the UE-DSS 510 else step 2 is again repeated.
    3. Read PSS and ESSS for BS.
    4. Calculate ESSSTimeSynci.
    5. Fetch CellIdi from PSS and ESSS for BS.
    6. Store CellIdi to FNAIList[i].cellId.
    7. Fetch and store FNAIi from ESSS to FNAIList[i].fnai for BS.
    8. Calculate and store timeSyncOffseti to FNAIList[i].timeSyncOffset using ESSSTimeSynci and ESSSTimeSyncRef.
    9. Increment NumberOfFNAI.
        a. Repeat steps 1 to 7 for countN_BS_SCAN.

For synchronizing, the method further includes providing, by the UE-RSS 515 of the UE 105, the synchronization results to the UE-DSS 510. The UE-RSS 515 provides FNAIList to the UE-DSS 510 by the UE-DSS-PHY-Path using START_SYNC_CNF.

At step 915, the method 900 includes multicasting, by the UE, an initial network access message (INAM) to at least one base station of the one or more base stations based on an multicast list. The INAM multicast list is prepared in response to the FNAI list.

The UE 105 prepares and multicasts the INAM in the following steps:
1. The UE-DSS 510 fetches network access related information (NARI) from TableNARI using FNAI.

a. The MAC Handler 730 in the UE-DSS 510 prepares BSInfoList with BS NARI info for each BS in FNAIList by performing the steps of:
   i. Stores FNAIList[i].cellId to BSInfoList[i].cellid; FNAIList[i].fnai to BSInfoList[i].fnai; FNAIList[i].timeSyncOffset to BSInfoList[i].timeSyncOffset;
   ii. Reads the NARI from TableNARI indexing by BSInfoList[i].fnai and Store TableNARI.[BSInfoList[i].fnai].INAMConfigIndex to BSInfoList[i].INAMConfigIndex; Store TableNARI.[BSInfoList[i].fnai].INAMRootSequnceIndex to BSInfoList[i].INAMRootSequnceIndex; Store TableNARI.[IBSInfoList[i].fnai].INAMZeroCorrelationZoneConfig to IBSInfoList[i].INAMZeroCorrelationZoneConfig; Store TableNARI.[IBSInfoList[i].fnai].INAMFreqOffset to IBSInfoList[i].INAMFreqOffset;

2. The UE-DSS 510 prepares the INAM Multicast List (INAMMCASTLIST) based on the NARI. The NARI is fetched based on an FNAI of the BS that is encoded within the ESSS.
   a. The MAC Handler 730 in the UE-DSS 510 prepares INAMBSGroupList from the BSInfoList of BS
      i. The MAC Handler 730 identifies sets of IBSInfoList entries (IBS) with sane configuration parameter values by comparing NARI parameters (such as INAMConfigIndex, INAMRootSequnceIndex, INAMZeroCorrelationZoneConfig, INAMFreqOffset, and the like.).
      ii. The MAC Handler 730 created separate group of BS entries (INAMBSGroup) for each of the identified set of BSInfoList entries (BS).
      iii. The MAC Handler 730 then populates INAMBSGroupList with the created INAMBSGroup(s).
      iv. The MAC Handler 730 arranges the INAMBSGroupList based on number of BS in each INAMBSGroup in the INAMBSGroupList.

3. The UE-DSS 510 prepares and provides INAM to the UE-RSS 515 by performing the following steps:
   a. The MAC Handler 730 in the UE-DSS 510 calculates timeOffsetINARm by differencing between maximum and minimum time offset of INAMBSGroupm elements.
   For example, timeOffsetINARm=max(INAMIBSGroupm[0], INAMIBSGroupm[1], . . . , INAMIBSGroupm[n])−min(INAMIBSGroupm[0], INAMIBSGroupm[1], . . . , INAMIBSGroupm[n]);
   b. The MAC Handler 730 prepares INAMm.
   c. The MAC Handler 730 adds timeOffsetINARm in INAMm.
   d. The MAC Handler 730 provides INAMm and INAMBSGroupm to the UE-RSS 515 by the UE-DSS-PHY Path using INAM_REQ at TransmitINAMtineInstance starting with m=0.

4. The UE-RSS 515 multicasts the INAM to the multiple BSs by performing the following steps:
   a. On receipt of INAM_REQ, the TBRH 625 starts timerReceiveINAM with the value (TransmitINAMtineInstance+timeOffsetINARm).
   b. The TBRH 625 provides cellid and timeSyncOffset of corresponding INAMBSGroup to the SRPB 615 to sync with the BS using BS_SYNC_REQ through TB Path and CB Path.
   c. The SRPB 615 performs quick sync using cellid and timeSyncOffset of corresponding INAMBSGroup and returns BS_SYNC_CNF.
   d. On Receipt of BS_SYNC_CNF, the TBRH 625 sends INAMm to the BS.
   e. Repeat the steps 2 to 4 for all BS in INAMBSGroup.

At step 920, the method 900 includes receiving, by the UE, at least one initial network access response (INAR) from the at least one base station of the one or more base stations in response to the INAM. Each INAR includes a current load information of the BS to indicate post latching service suitability of the at least one base station. The current load information is based on factors comprising a current throughput of the base station, a guaranteed bit rate subscription of the UE, number of UE, supported UE, and core network overloading condition. The steps performed at the BS is detailed below:

1. The BS prepares and sends INAR on decoding the INAM received from the UE.
   a. The INAM is received from the UE and decoded by the following steps:
      i. The RSS 220 receives and provides the INAM to the DSS 205. Store INAM reception time in ReceiveINAMtimeInstance.
      ii. The MAC Handler 330 in the DSS 205 decodes INAM and stores timeOffsetINARm to timeOffsetINARIBS.
   b. The BS prepares INAR and transmits to the UE by performing the steps of:
      i. The MAC Handler 330 prepares INAR.
      ii. The MAC Handler 330 adds BSLoad in INAR
      iii. The MAC Handler 330 calculates SendINARtimeInstance based on timeOffsetINARIBS. For example, SendINARtimeInstance=ReceiveINAMtineInstance+timeOffsetINARIBS.
      iv. The MAC Handler 330 provides INAR at SendINARtimeInstance to the RSS 220 using INAR_REQ through DSS-PHY Path.
      v. The RSS 220 sends INAR to the UE.

At step 925, the method 900 includes processing, by the UE, the at least one INAR to determine at least one suitable base station.

1. The UE processes INAR by performing the following steps:
   a. The UE-RSS 515 receives INAR:
      i. On expiry of timerReceiveINAR the TBRH 625 provides cellid and timeSyncOffset of corresponding INAMBSGroup to the SRPB 615 to sync with the BS using BS_SYNC_REQ through TB Path and CB Path.
      ii. The SRPB 615 performs quick sync using cellid and timeSyncOffset of corresponding INAMBSGroup and returns BS_SYNC_CNF.
      iii. Once sync is done, the TBRH 625 receives INARj from the IBS and stores cellid, timeSyncOffset and INARj to INARBSList
      iv. Repeat the steps from i. to iii. for all BS in INAMBSGroup.
   b. The UE-RSS 515 provides INAR to the UE-DSS 510:
      i. The UE-RSS 515 provides INARBSList to the UE-DSS 510 by the UE-DSS-PHY-Path using INAM_CNF At step 930, the method 900 includes synchronizing, by the UE, with the suitable base station to access the network in the coverage area by performing the following steps.

1. The UE selects a suitable BS by performing steps of:
   a. The MAC Handler 730 in the UE-DSS 510 checks if INARBSList is empty and selects INAMBSGroupm+1 from INAMBSGroupList and go to step 3 of step 915

(UE-DSS 510 prepares and provides INAM to the UE-RSS 515) else go to step b below.

b. The MAC Handler 730 calculates CoefficientsBSi using BSLoad_i and BSPower_i c. Repeat Step b for all BS in INARBSList.

d. The MAC Handler 730 selects the cellid of INARBSList with highest CoefficientsIBSi.

2. The UE syncs with the BS by performing:

a. The MAC Handler 730 sends BS_SELECT_REQ with cellid and timeSyncOffset corresponding to INARBSList to the UE-RSS 515 through UE-DSS-PHY Path.

b. On receipt of BS_SELECT_REQ, the TBRH 625 provides cellid and timeSyncOffset corresponding to INARBSList to the SRPB 615 to sync with the BS using BS_SYNC_REQ through TB Path and CB Path.

c. The SRPB 615 performs quick sync using cellid and timeSyncOffset corresponding to INARBSList and returns BS_SYNC_CNF.

d. The TBRH 625 sends IBS_SELECT_CNF to the UE-CSS 510.

e. The UE-DSS 510 sends BS_CONNECT_CNF to the UE-CSS 520 with cellid corresponding to INARBSList through UE-CSS-DSS Path.

In some embodiments, the method 900 includes registering, by the UE, with the suitable base station by transmitting a registration request to the suitable base station. On receipt of BS_CONNECT_CNF, the UE-CSS 520 sends the registration request.

Figure 10:
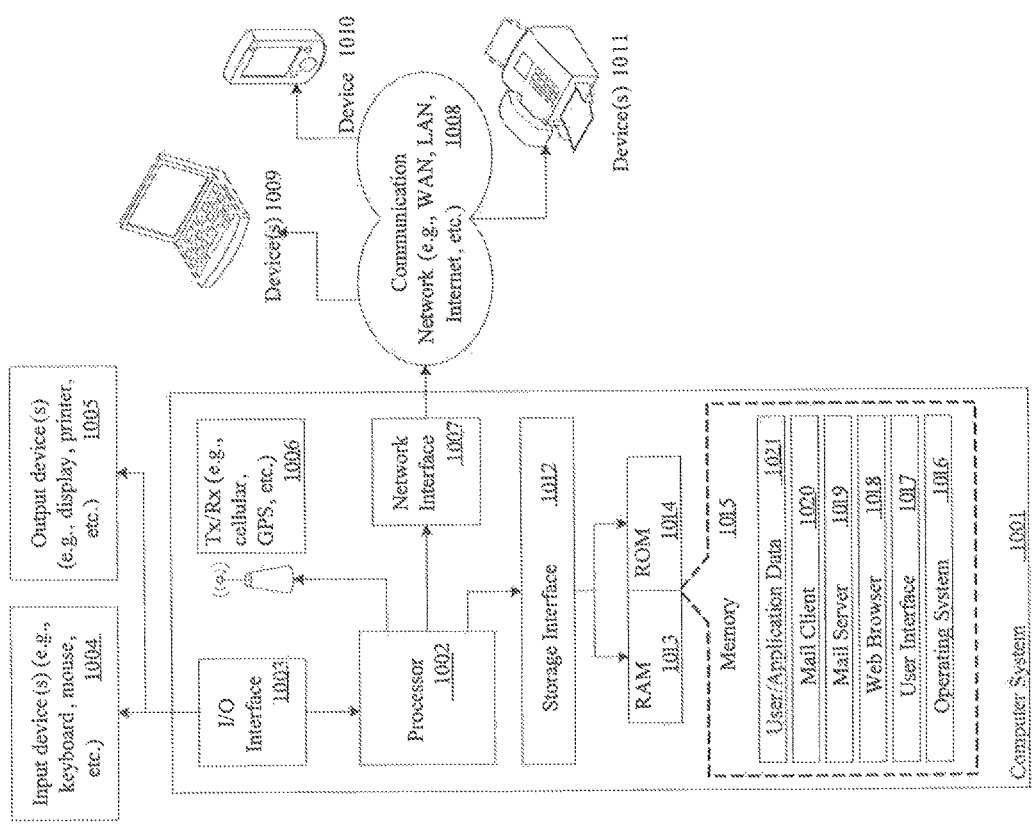
FIG. 10 illustrates a block diagram of an exemplary computer system for implementing various embodiments, in accordance with some embodiments of the present disclosure.

FIG. 10 illustrates a block diagram of an exemplary computer system for implementing embodiments consistent with the present disclosure. Variations of computer system 1001 may be used for performing optical character recognition on an image including a plurality of printed characters. The computer system 1001 may comprise a central processing unit ("CPU" or "processor") 1002. Processor 1002 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1002 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1002 may be disposed in communication with one or more input/output (I/O) devices via I/O interface 1003. The I/O interface 1003 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1003, the computer system 1001 may communicate with one or more I/O devices. For example, the input device 1004 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1005 may be a printer, fax machine, video display (e.g., cathode ray tube (CRT), liquid crystal display (LCD), light-emitting diode (LED), plasma, or the like), audio speaker, etc. In some embodiments, a transceiver 1006 may be disposed in connection with the processor 1002. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1002 may be disposed in communication with a communication network 1008 via a network interface 1007. The network interface 1007 may communicate with the communication network 1008. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1008 may include, without limitation, a direct interconnection, local area network (LAN), wide area network (WAN), wireless network (e.g., using Wireless Application Protocol), the Internet, etc. Using the network interface 1007 and the communication network 1008, the computer system 1001 may communicate with devices 1010, 1011, and 1012. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1001 may itself embody one or more of these devices.

In some embodiments, the processor 1002 may be disposed in communication with one or more memory devices (e.g., RAM 1013, ROM 1014, etc.) via a storage interface 1012. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1016, user interface application 1017, web browser 1018, mail server 1019, mail client 1020, user/application data 1021 (e.g., any data variables or data records discussed in this disclosure), etc. The operating system 1016 may facilitate resource management and operation of the computer system 1001. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1017 may facilitate display, execution, interaction, manipulation, or operation of program components through textual or graphical facilities. For example, user interfaces may provide computer interaction interface elements on a display system operatively connected to the computer system 1001, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1001 may implement a web browser 1018 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1001 may implement a mail server 1019 stored program component. The mail server 1019 may be an Internet mail server such as Microsoft Exchange, or the like. The mail server 1019 may utilize facilities such as ASP, ActiveX, ANSI C++/C#, Microsoft.NET, CGI scripts, Java, JavaScript, PERL, PHP, Python, WebObjects, etc. The mail server 1019 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1001 may implement a mail client 1020 stored program component. The mail client may be a mail viewing application, such as Apple Mail Microsoft Entourage, Microsoft Outlook, Mozilla Thunderbird, etc.

In some embodiments, computer system 1001 may store user/application data 1021, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Embodiments of the present disclosure provide a method and system for performing an initial network access procedure by a user equipment to access a network in a coverage area. The initial network access procedure of the present disclosure provides for faster latching, reduced latching failure and improved service continuity. The faster latching is achieved by avoiding NARI wait time prior-to INAM initiation and by initiating simultaneous INAM requests with multiple potential BSs. This is enabled by the SRPB 415 in the RSS 220, the MAC Handler 730 in the UE-DSS 510, and the TBRH 625, the SRPB 615 in the UE-RSS 515. The reduced latching failure is achieved by avoiding NARI wait-timeout (prior-to INAM initiation), by reducing INAM collision, by avoiding latching to an unsuitable BS (by taking into consideration network condition, BS load and ability to support required services, and the like). This is enabled by the MAC Handler 330 in the DSS 205, the MAC Handler 730 in the UE-DSS 510 and the TBRH 625, the SRPB 615 in UE-RSS 515. The improved service continuity (post latching) is achieved by determination of target base stations (by taking into consideration network condition, BS load and ability to support required services, and the like). This is enabled by the MAC Handler 730 in the UE-DSS 510 and the TBRH 625, the SRPB 615 in the UE-RSS 515.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of performing an initial network access procedure by a user equipment to access a network in a coverage area, the method comprising:
   performing, by the user equipment (UE), an initialization procedure of the UE;
   synchronizing, by the UE, with one or more base stations to prepare a fast network access index (FNAI) list;
   multicasting, by the UE, an initial network access message (INAM) to at least one base station of the one or more base stations based on an INAM multicast list, wherein the INAM multicast list is prepared in response to the FNAI list, wherein the INAM multicast list is prepared by:
   fetching, by a UE data subsystem (UE-DSS) of the UE, network access related information (NARI); and
   preparing, by the UE-DSS of the UE, the INAM multicast list based on the NARI, wherein the NARI is fetched based on a FNAI of the at least one base station that is encoded within an extended secondary synchronization signal (ESSS);
   receiving, by the UE, at least one initial network access response (INAR) from the at least one base station of the one or more base stations in response to the INAM, each INAR comprising a current load information of the at least one base station to indicate post latching service suitability of the at least one base station;
   processing, by the UE, the at least one INAR to determine at least one suitable base station; and
   synchronizing, by the UE, with the suitable base station to access the network in the coverage area.

2. The method as claimed in claim 1, wherein performing the initialization procedure of the UE comprises one of:
   initializing the UE during start-up of the UE;
   initializing the UE during rebooting of the UE; and
   initializing the UE during re-latching of the UE.

3. The method as claimed in claim 1, wherein synchronizing with the one or more base stations comprises:
   scanning a primary synchronization signal (PSS) and the ESSS for each of the one or more base stations to generate synchronization results, the FNAI list is prepared during the scanning; and
   providing, by a UE radio subsystem (UE-RSS) of the UE, the synchronization results to the UE-DSS.

4. The method as claimed in claim 1, wherein the FNAI list comprises cell identification number, a FNAI, and an offset time between the one or more base stations, the offset time being added in the INAM to inform the at least one base station to transmit the INAR on expiry of the offset time from receipt of the INAM.

5. The method as claimed in claim 1, wherein the INAR is prepared by the at least one base station on decoding the INAM received from the UE.

6. The method as claimed in claim 1, wherein the current load information is based on factors comprising a current throughput of the at least one base station, a guaranteed bit rate subscription of the UE, number of UE, supported UE, and core network overloading condition.

7. The method as claimed in claim 1 and further comprising:
   registering, by the UE, with the suitable base station by transmitting a registration request to the suitable base station.

8. A user equipment for performing an initial network access procedure to access a network in a coverage area, the user equipment comprising:
   a processor; and
   a memory, communicatively coupled to the processor, wherein the memory stores processor-executable instructions, which, on execution, causes the processor to:
   perform an initialization procedure of the user equipment (UE);
   synchronize with one or more base stations to prepare a fast network access index (FNAI) list;
   multicast an initial network access message (INAM) to at least one base station of the one or more base stations based on an INAM multicast list, wherein the INAM multicast list is prepared in response to the FNAI list, wherein the INAM multicast list is prepared by:
   fetching, by a UE data subsystem (UE-DSS) of the UE, network access related information (NARI); and
   preparing, by the UE-DSS of the UE, the INAM multicast list based on the NARI, wherein the NARI is fetched based on a FNAI of the at least one base station that is encoded within an extended secondary synchronization signal (ESSS);
   receive at least one initial network access response (INAR) from the at least one base station of the one or more base stations in response to the INAM, each INAR comprising a current load information of the at least one base station to indicate post latching service suitability of the at least one base station;
   process the at least one INAR to determine at least one suitable base station; and
   synchronize with the suitable base station to access the network in the coverage area.

9. The UE as claimed in claim 8, wherein the processor is further configured to perform the initialization procedure of the UE by one of:

initializing the UE during start-up of the UE;
initializing the UE during rebooting of the UE; and
initializing the UE during re-latching of the UE.

10. The UE as claimed in claim 8, wherein the processor is further configured to synchronize with the one or more base stations by:
scanning a primary synchronization signal (PSS) and the ESSS for each of the one or more base stations to generate synchronization results, the FNAI list is prepared during the scanning; and
providing, by a UE radio subsystem (UE-RSS) of the UE, the synchronization results to the UE-DSS.

11. The UE as claimed in claim 8, wherein the FNAI list comprises cell identification number, a FNAI, and an offset time between the one or more base stations, the offset time being added in the INAM to inform the at least one base station to transmit the INAR on expiry of the offset time from receipt of the INAM.

12. The UE as claimed in claim 8, wherein the INAR is prepared by the at least one base station on decoding the INAM received from the UE.

13. The UE as claimed in claim 8, wherein the current load information is based on factors comprising a current throughput of the at least one base station, a guaranteed bit rate subscription of the UE, number of UE, supported UE, and core network overloading condition.

14. The UE as claimed in claim 8, wherein the processor is further configured to:
register with the suitable base station by transmitting a registration request to the suitable base station.

15. A non-transitory computer readable medium including instructions stored thereon that when processed by at least one processor causes a user equipment to perform operations comprising:
performing an initialization procedure of the user equipment (UE);
synchronizing with one or more base stations to prepare a fast network access index (FNAI) list;
multicasting an initial network access message (INAM) to at least one base station of the one or more base stations based on an INAM multicast list, wherein the INAM multicast list is prepared in response to the FNAI list, wherein the INAM multicast list is prepared by:
fetching, by a UE data subsystem (UE-DSS) of the UE, network access related information (NARI); and
preparing, by the UE data subsystem (UE-DSS) of the UE, the INAM multicast list based on the NARI, wherein the NARI is fetched based on a FNAI of the at least one base station that is encoded within an extended secondary synchronization signal (ESSS);
receiving at least one initial network access response (INAR) from the at least one base station of the one or more base stations in response to the INAM, each INAR comprising a current load information of the at least one base station to indicate post latching service suitability of the at least one base station;
processing the at least one INAR to determine at least one suitable base station; and
synchronizing with the suitable base station to access the network in the coverage area.

* * * * *